(12) United States Patent
Ganesan et al.

(10) Patent No.: US 10,127,038 B1
(45) Date of Patent: Nov. 13, 2018

(54) SOFTWARE DEFECT REDUCTION

(71) Applicant: Aetna Inc., Hartford, CT (US)

(72) Inventors: Sriram Ganesan, North Wales, PA (US); Kraig Dandan, New London, CT (US); Joseph P. Foley, West Hartford, CT (US); Songdong Tian, West Hartford, CT (US); John R. Sullivan, Middletown, CT (US); Abrar Desai, East Windsor, CT (US)

(73) Assignee: Aetna Inc., Hartford, CT (US)

( * ) Notice: Subject to any disclaimer, the term of this patent is extended or adjusted under 35 U.S.C. 154(b) by 0 days.

(21) Appl. No.: 15/493,571

(22) Filed: Apr. 21, 2017

(51) Int. Cl.
| | |
|---|---|
| *G06F 9/44* | (2018.01) |
| *G06F 8/71* | (2018.01) |
| *G06F 11/36* | (2006.01) |
| *G06F 17/30* | (2006.01) |
| *G06Q 10/10* | (2012.01) |

(52) U.S. Cl.
CPC ............ *G06F 8/71* (2013.01); *G06F 11/3664* (2013.01); *G06F 11/3692* (2013.01); *G06F 17/30563* (2013.01); *G06Q 10/103* (2013.01)

(58) Field of Classification Search
None
See application file for complete search history.

(56) References Cited

U.S. PATENT DOCUMENTS

2015/0082281 A1* 3/2015 Koenig ............... G06F 11/3668
717/124

* cited by examiner

*Primary Examiner* — Chuck Kendall
(74) *Attorney, Agent, or Firm* — Leydig, Voit & Mayer, Ltd.

(57) ABSTRACT

A method, system and computer readable medium are provided for software defect reduction. To perform the software defect reduction implementation parameters for a software application in a development phase are collected, and an Extract, Transform and Load (ETL) is performed. The ETL analyzes data from one or more databases based on the implementation parameters to obtain relevant implementation data. The one or more databases store implementation data related to previously developed software applications, and the relevant implementation data is data stored in the one or more databases that is data that is relevant to the implementation parameters. The relevant implementation data is then summarized to obtain predicted data relevant to the software application in the development phase.

16 Claims, 8 Drawing Sheets

| Project | App ID | Release Month | Release Year | Domain - QA | Domain - AD | Capability Pattern | Compliance? | Perf Testing? | Pre Implementation Findings (CQ) | Pre Implementation Defects at Rise Signoff | System Test Scripts (QC) | Deployment Risk Score | Estimated DRE | Estimated Post Implementation Defect |
|---|---|---|---|---|---|---|---|---|---|---|---|---|---|---|
| P06-9939 | A1869 | November | 2014 | | Member | | | | | 20 | 0 | 12% | Average (96%) | 1 |
| P08-7147w | A159 | November | 2014 | Network & Provider | Claim | Warranty Only | N | N | 0 | 6 | 70 | 11% | Rocky Road (80%) | 2 |
| P08-7147w | A1807 | November | 2014 | Network & Provider | Claim | Warranty Only | N | N | 0 | 0 | 0 | 89% | Below Average (90%) | - |
| P08-7147w | A1924 | November | 2014 | Network & Provider | Billing | Warranty Only | N | N | 0 | 5 | 33 | 6% | Rocky Road (80%) | 1 |
| P08-7147w | A1924 | December | 2014 | Network & Provider | Billing | Warranty Only | N | N | 0 | 2 | 18 | 6% | Below Average (90%) | 0 |
| P08-7147w | A2052 | December | 2014 | Network & Provider | Corporate | Warranty Only | N | N | 0 | 0 | 0 | 89% | Average (96%) | - |
| P08-7147w | A901 | November | 2014 | Network & Provider | Claim | Warranty Only | N | N | 0 | 0 | 0 | 89% | Average (96%) | - |
| P08-7518w | A159 | November | 2014 | Claim | Claim | | N | N | 0 | 3 | 24 | 6% | Average (96%) | 0 |
| P08-7826c | A132 | November | 2014 | Corporate | Claim | | N | Y | 0 | 0 | 0 | 89% | Average (96%) | - |
| P08-7826c | A139 | December | 2014 | Corporate | Plan Sponsor | | N | Y | 0 | 0 | 12 | 4% | Average (96%) | - |
| P08-7826c | A1801 | November | 2014 | Corporate | Channel Management | | N | Y | 0 | 173 | 513 | 74% | Average (96%) | 7 |
| P08-7826c | A2631 | November | 2014 | Corporate | Informatics | | N | Y | 0 | 0 | 0 | 89% | Average (96%) | - |
| P08-7826c | A2968 | November | 2014 | Corporate | Informatics | | N | Y | 0 | 1 | 355 | 4% | Average (96%) | 0 |
| P08-7826c | A894 | December | 2014 | Corporate | Plan Sponsor | | N | Y | 0 | 0 | 16 | 4% | Average (96%) | - |
| P08-8069E | A2020 | November | 2014 | Medical Management | Medical Management | Agile Development | N | N | 0 | 0 | 5 | 6% | Average (96%) | - |

FIG. 8

SOFTWARE DEFECT REDUCTION

BACKGROUND

Complexity of software applications is ever increasing. It is common in modern software applications to interact with a plurality of disparate other applications and data sources. As the complexity of software applications increases so does the number of software defects experienced by the software application. As the number of software defects increases, so does a cost associated with correcting those defects.

Controlling quality and costs of software applications, both during and after development, is a primary objective of any Information Technology (IT) organization. As such, certain commercial products are available to help an IT organization control quality and costs. These products operate to find defects in code and provide dashboard functionality for development. Typically, the products function by reviewing only a current state of development for the software application being developed.

BRIEF SUMMARY

In one embodiment, a method for software defect reduction performed by a software defect reduction server is provided. The method includes collecting implementation parameters for a software application in a development phase. The method further includes performing an Extract, Transform and Load (ETL) from one or more databases based on the implementation parameters to obtain relevant implementation data, wherein the one or more databases store implementation data related to previously developed software applications and the relevant implementation data is data stored in the one or more databases that is relevant to the implementation parameters. The method also includes summarizing the relevant implementation data to obtain predicted data relevant to the software application in the development phase.

In another embodiment, a system for software defect reduction is provided. The system includes a software defect reduction server comprising a processor. The processor is configured for: collecting implementation parameters for a software application in a development phase; performing an Extract, Transform and Load (ETL) from one or more databases based on the implementation parameters to obtain relevant implementation data, wherein the one or more databases store implementation data related to previously developed software applications and the relevant implementation data is data stored in the one or more databases that is relevant to the implementation parameters; and summarizing the relevant implementation data to obtain predicted data relevant to the software application in the development phase.

In yet another embodiment, a non-transitory computer-readable medium containing computer executable instructions for software defect reduction is provided. The computer readable instructions, when executed by a processor, cause the processor to perform steps including: collecting implementation parameters for a software application in a development phase; performing an Extract, Transform and Load (ETL) from one or more databases based on the implementation parameters to obtain relevant implementation data, wherein the one or more databases store implementation data related to previously developed software applications and the relevant implementation data is data stored in the one or more databases that is relevant to the implementation parameters; and summarizing the relevant implementation data to obtain predicted data relevant to the software application in the development phase.

BRIEF DESCRIPTION OF THE DRAWINGS

FIG. 8 illustrates an exemplary embodiment of a defect prediction made by the system of FIG. 1.

DETAILED DESCRIPTION

Systems and techniques available today in the market for finding and fixing software defects lack holistic (providing total perspectives on quality of software projects as well as causes for quality issues, applications, resources and costs across project life cycle), integrated (integrating software defects, resource and financial management aspects as well as prediction model of defects, costs and resources) and intelligent (applying various prediction algorithms on historical data to predict pre-implementation and post-release defects) ways of analyzing software applications under development. Such a system would empower software application development teams to efficiently allocate or reallocate resources and costs for development and/or for development phases (e.g. testing) thereby containing cost of IT operations.

Embodiments of the disclosure provide for holistic, integrated and intelligent software defect reduction in complex software development projects. This is accomplished by bringing multiple types of information components that are typically impacted by software defects during a development lifecycle into context for analysis, deriving insights, applying algorithms to predict defects in order to further predict required project resources and costs. By bringing these various impacted components of information together into the context of the entire software development project, over the lifecycle of development, makes embodiments of the disclosure holistic. By providing linkage across defects, test scripts, resources, costs and prediction data for both pre-implementation and post implementation phases of development makes embodiments of the disclosure integrated. By applying algorithms on historical data to predict both pre-implementation and post-implementation impacts on software development projects and predict costs makes embodiments of the disclosure intelligent.

Embodiments of the disclosure further provide bringing all of the above described types of information together at a user interface and display relevant information in a unified dashboard. The unified dashboard provides visibility on various types of information to end users and allows the end user to drill into a multitude of details (projects, applications, defects, test scripts, resources, costs, impact to a development schedule, etc.) in order to make project decisions during the software development phase, for both pre-implementation and post-implementation phases.

Figure 1:
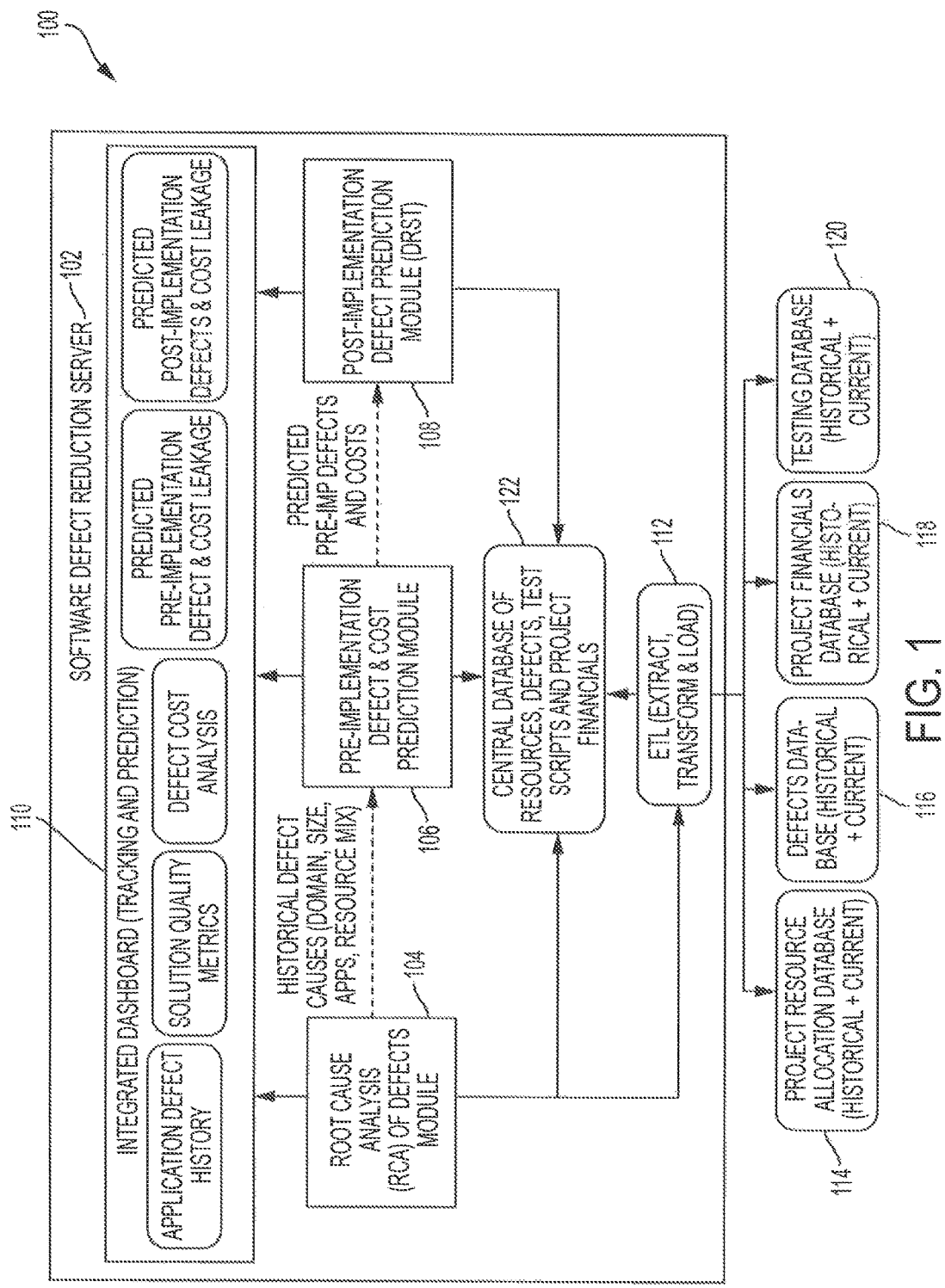
FIG. 1 illustrates a system level diagram for holistic, integrated and intelligent software defect reduction in complex software projects with a software defect reduction server, in accordance with certain embodiments of the disclosure.

FIG. 1 illustrates a system 100 for holistic, integrated and intelligent software defect reduction for complex software projects. The system 100 includes a software defect reduction server 102, which includes a Root Cause Analysis (RCA) of Defects Module 104, a Pre-Implementation Defect and Cost Prediction (DCP) Module 106, a Post-Implementation Defect Prediction (DRST) Module 108, a central database 122 and an Extract, Transform & Load (ETL) 112 and hosts an Integrated Dashboard User Interface (UI) 110.

RCA module 104 is responsible for analyzing defects data in past software application projects over a certain time period and combining with software project resources and financial data to derive outcomes such as root causes of defects in design and development phases of current ongoing software projects. The RCA module 104 shows which related software applications and service providers contributed to defects for the root causes of previous related software applications and an amount of resources and cost spent by trying to eliminate those root causes. This historical analysis of older previously implemented software applications provides information relevant for determining potential root causes analysis for defects and a cost of correcting those defects for similar software applications being developed currently.

In order to provide the defect and cost analysis, the RCA module 104 collects implementation parameters for the software application currently being developed. Specifically, the RCA module 104 collects implementation parameters related to a software application currently in development and uses these implementation parameters to provide an appropriate query to relevant databases. In the illustrated embodiment, the RCA module 104 sends the implementation parameters to an Extract, Transform and Load (ETL) module 112, which in turn extracts relevant implementation data from prior developed software applications from one or more of databases 114-120. Databases 114-120 includes a project resource allocation database 114 for both current and historical software projects, a defects database 116 for both current and historical defects, a project financials database 118 for bother current and historical financial data, and a testing database 120 for both current and historical testing data of various software applications.

The relevant implementation data is gathered from databases 114-120 by searching all of the implementation data stored for prior developed software applications. The implementation data is then transformed into a useable format and loaded into a central database 122 accessible to the RCA module 104. In the illustrated embodiment, the RCA module 104 functions as the backbone of the system 100 in that it collects and visualizes the implementation data for both the integrated dashboard UI 110 and further provides analyzed implementation data to the DCP module 106, which in turn may provide the implementation data to the DRST module 108.

In certain embodiments, the implementation data includes one or more of defects data organized by project number and/or project name, applications that are affected by the defect, project start and end dates, a project phase when the defect occurs, a business organization supported by the software application, a root cause of the defect as identified in Waterfall or Agile methodologies. The implementation data may further include one or more of a domain of the prior software applications and measures including a number of defects, estimated cost of fixing the defect during a particular phase (design, development, testing, deployment and production). The RCA module 104 also collects project resource type implementation data to analyze an impact of defects on resources based on labor costs spent to fix defects. The RCA module 104 uses project cost type implementation data to calculate the impact of defects on project costs across multiple dimensions such as the software project itself, at various phases in development of the software project, and at the application domain and methodology level.

The Pre-Implementation Defect & Cost Prediction (DCP) module 106 accepts historical relevant implementation data from the RCA module 104. This data includes domain, size, application, resource and other types of data. Using this data, the DCP module 106 generates a prediction of the cost that a software application will incur to fix defects. In certain embodiments, this cost may be displayed as a percentage of a total software application project cost. The DCP module 106 may accept a variety of inputs from the RCA module 104, such as: a project start date, an cost and resource investment category, a methodology capability pattern, a primary release, an expanded business needs count, data regarding whether the software application project is a compliance project, data regarding whether the software application project is an external integration, an estimated cost, a labor percentage of the software application project cost, a percentage of offshore costs, a number of application domains impacted, a percentage distribution of software application project effort by application domain, an average project manager experience, an average software architect experience, an average software developer experience, an average business analyst experience, and an average software tester experience. In certain embodiments, one or more of these inputs are provided from the RCA module 104 via a data collection template.

The DCP module 106 uses the input data received from the RCA module 104 and applies a predictive model. The output of the predictive model provides a defect and cost prediction for the software application being analyzed. In certain embodiments, this prediction will be accompanied along with a high and low range for each prediction related to defects and costs. In certain embodiments, the predictive model is a Random Forest algorithm trained using historical data. In certain embodiments, any predictions made by the DCP module 106 may be stored in the central database 122.

The DCP module 106 provides the pre-implementation predicted cost and defect data to the Post-Implementation Defect Prediction (DRST) module 108. The DRST module 108 generates a prediction of whether a deployment of a software application will experience defects during a warranty period after the deployment. The DRST module 108 takes a variety of inputs, such as a number of system test scripts, a number of pre-implementation defects, a number of pre-implementation findings, a methodology capability pattern, and whether performance testing was done, among other inputs.

A predictive model utilizes this data to determine a probability that the software application deployment will experience defects during the warranty period. In certain embodiments, the predictive model consists of an ensemble model including a Decision Tree model and a Logistic Regression model. Both the Decision Tree model and the Logistic Regression model make a prediction using the input data and, in certain embodiments, the two predictions are combined into a final prediction using a second Logistic Regression model. These models are trained using historical deployment and defect data. The final predicted value may be referred to as a Deployment Risk Score (DRS), which assesses a risk of post-implementation defects. The DRS may be represented by a percentage value between 0-100 percent. In certain embodiments, any predictions made by the DRST module 108, including the DRS, may be stored in the central database 122.

The RCA module 104, the DCP module 106 and the DRST module 108 summarize the collected relevant implementation data and any prediction data for integrated dashboard UI 110. The integrated dashboard UI 110 takes the summarized relevant implementation data and prediction data and provides various types of analyses across a variety of projects, schedules, domains, organizations, applications, methodologies, phases, root causes and dates against measures such as number of defects, project costs and defect costs. The integrated dashboard UI 110 provides an interactive visualization summary and detailed analysis of defects, resources and costs for each phase of a project along with various interacting applications. The integrated dashboard UI 110 displays analysis results for any selected project as well as pertinent historical data from past projects from corresponding applications that have been collected by the RCA module 104 as relevant implementation data. The integrated dashboard UI 110 may also display any predicted data from either of the DCP module 106 or the DRST module 108.

The integrated dashboard UI 110 accepts inputs from three separate sources—the RCA module 104, the DCP module 106 and the DRST module 108. The integrated dashboard UI 110 takes historical implementation data from the RCA module 104 that pertains to historical defect, root cause, resource and cost impact data as well as other project data such as "Project ID," "Project Description," "Project Phase," "Organization" and "Methodology Capability Pattern." The integrated dashboard UI 110 makes use of the RCA module 104, the DCP module 106 and the DRST module 108 to provide an interactive visualization dashboard that provides historically relevant data regarding defects, root causes of those defects and a cost of the defects in both monetary and resource terms.

Figure 4:
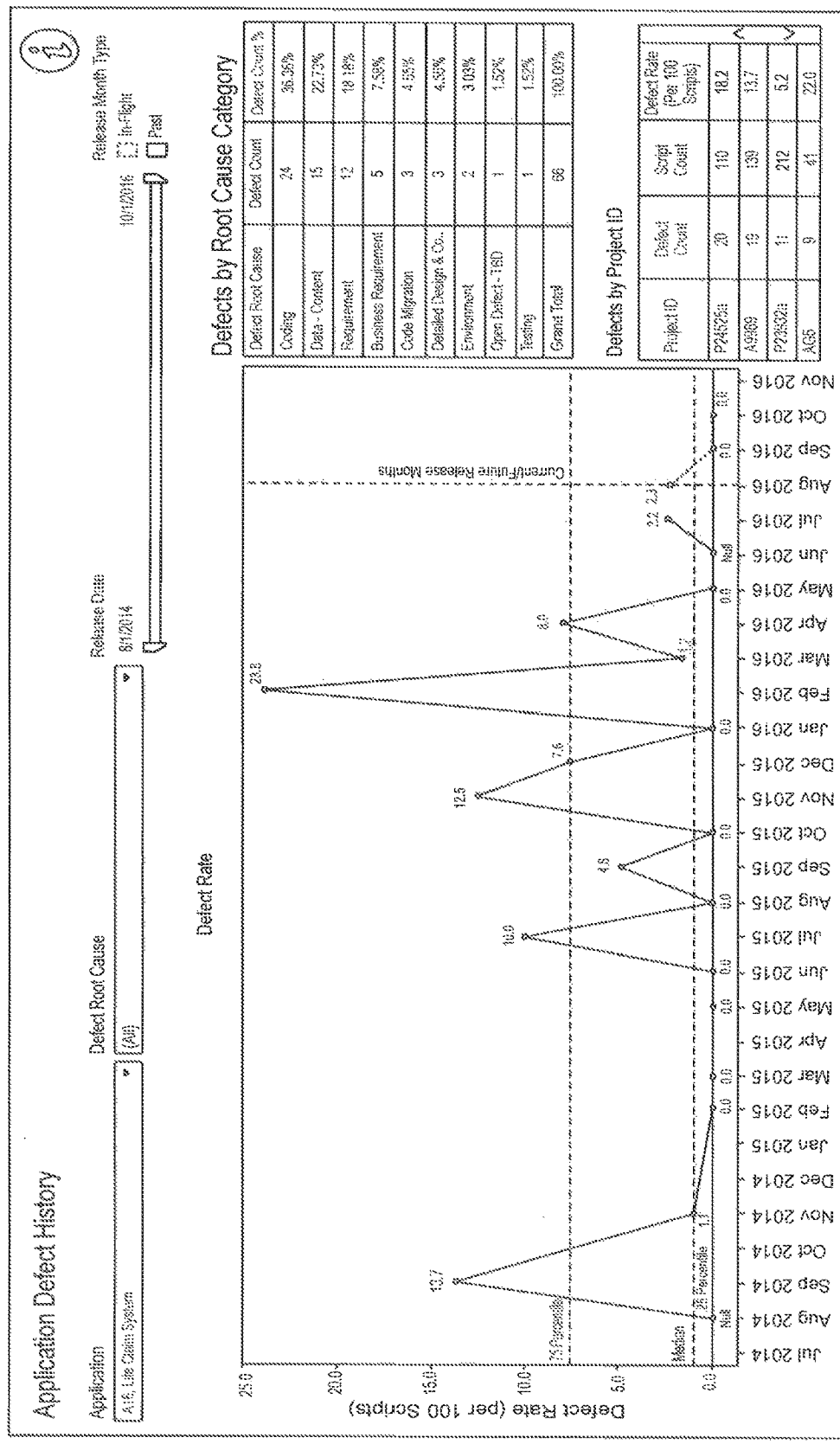
FIGS. 4-7 illustrate exemplary embodiments of an integrated dashboard user interface, in accordance with certain embodiments of the disclosure.

FIGS. 4-7 illustrate exemplary results of the analysis performed by the RCA module 104 and visualized by the integrated dashboard UI 110. FIG. 4 illustrates an "Application Defect History" view of the UI 110 showing a defect rate over time for a "Life Claim System" application, as indicated in the "Application" drop down box. Other applications are available for user selection within the "Application" drop down box such that upon selection application metrics will be displayed for the selected application. Typically, the metric displayed will be based on data collected over a user selected time period, such as the last 24 months.

In the illustrated embodiment, the defect rate is selected to be based on "All" root causes, as shown in the "Defect Root Cause" drop down box. The "Defect Root Cause" drop down box allows a user to select a root cause category attributed to discovered defects. FIG. 4 further illustrates a "Defects by Root Cause Category" table that shows a listing of the various root causes of the summarized defects based on the selection in the "Defect Root Cause" drop down box. For each defect root cause displayed under the "Defects by Root Cause Category," a number of defects for each root cause and a percentage of the total number of defects that can be attributed to that root cause are shown. The number of defects in the "Defects by Root Cause Category" table is shown based on a user defined time line as shown in a date range illustrated above the "Defects by Root Cause Category." This date range is based on an entered "Release Date" for the selected application to be deployed and shown for a user selected period of time after the "Release Date."

The date range further defines the time period displayed on the x-axis of the "Defect Rate" chart. The y-axis of the "Defect Rate" chart provides a defect rate per one-hundred scripts. This represents a defect rate for the selected application for the selected release date. The defect rate includes both pre and post-implementation defects and excludes findings and withdrawn defects. In the illustrated embodiment, percentiles are shown; specifically, the 25 percentile, the median and the 75 percentile are shown. The 25 percentile indicates 25% of releases with a lowest/most favorable defect rate for the application; the median indicates a midpoint of releases with the lowest/most favorable defect rates below, and less favorable above 50% for the application; and 75 percentile delimits a more favorable 75% and least favorable 25% of application release defect rates for the selected application.

FIG. 4 further illustrates a "Defects by Project ID" table that relates a "Project ID" to a "Defect Count" to a "Script Count" to a "Defect Rate (Per 100 Scripts)." The "Project ID" provides an ID of the project implementing the application against which defects were logged for the selected application. The "Script Count" provides a number of scripts that were planned to test the selected application in the selected date range. The "Defect Count" provides a number of defects for the selected application in the selected date range. The "Defect Rate (Per 100 Scripts)" provides a percent of total defects for the selected application during the selected date range.

Figure 5:
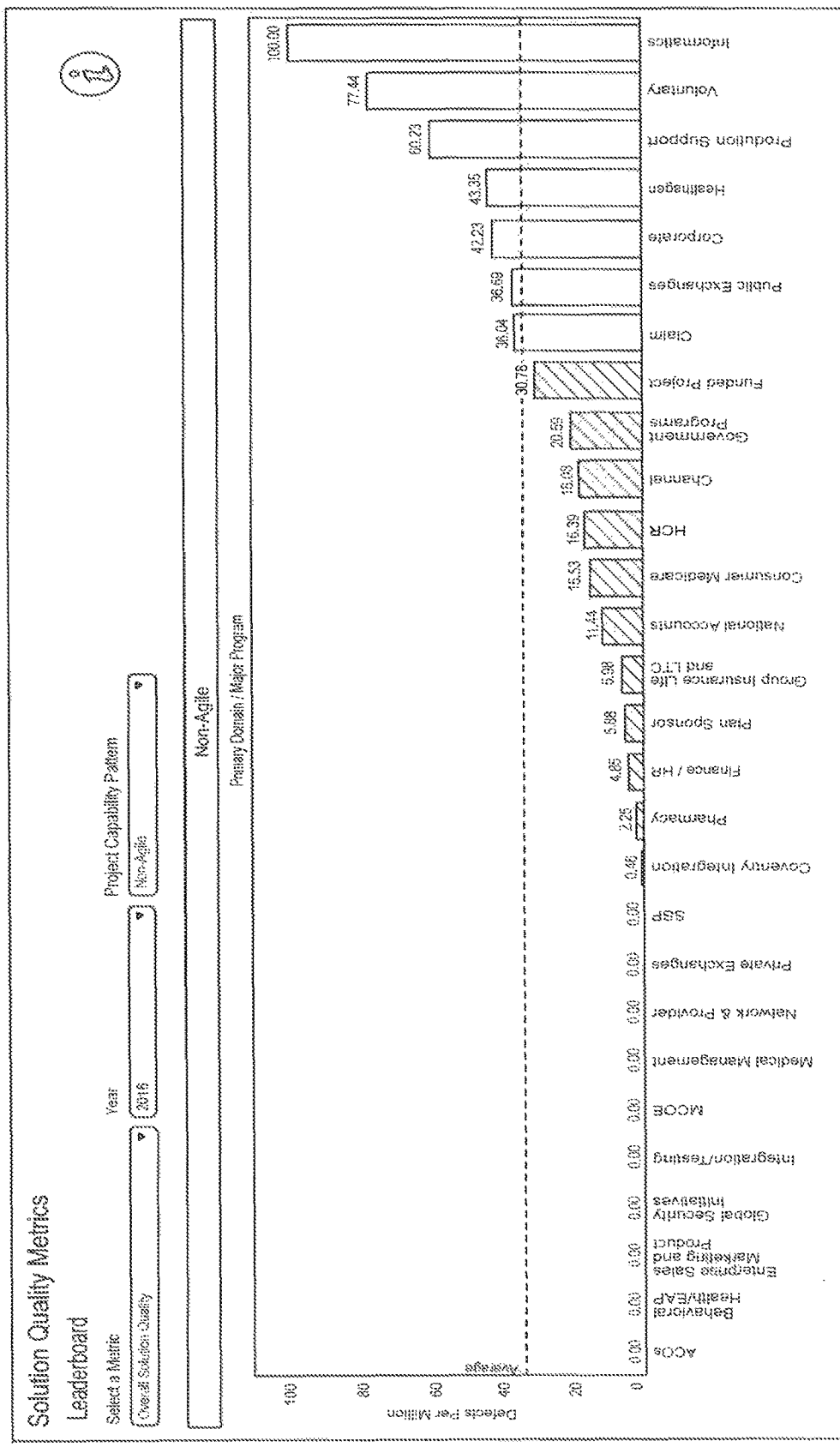

FIG. 5 illustrates a "Solutions Quality Metrics" view of the UI 110 showing a "Defects per Million" for a plurality of organization projects. This view shows which applications assigned per business organization have the most defects. The illustrated view shows the leader board such that the organization with the fewest defects is listed on the left up to the most defects on the right. This view includes three drop-down boxes. The first drop-down box is the "Select a Metric" box that allows a user to select a quality metric to visualize. The "Year" box allows a user to select a year for visualization. The "Project Capability Pattern" box allows a type of application to be selected for visualization—the illustrated embodiment is showing "Non-Agile" applications, while an Agile option is also available for selection by the user.

Figure 6:
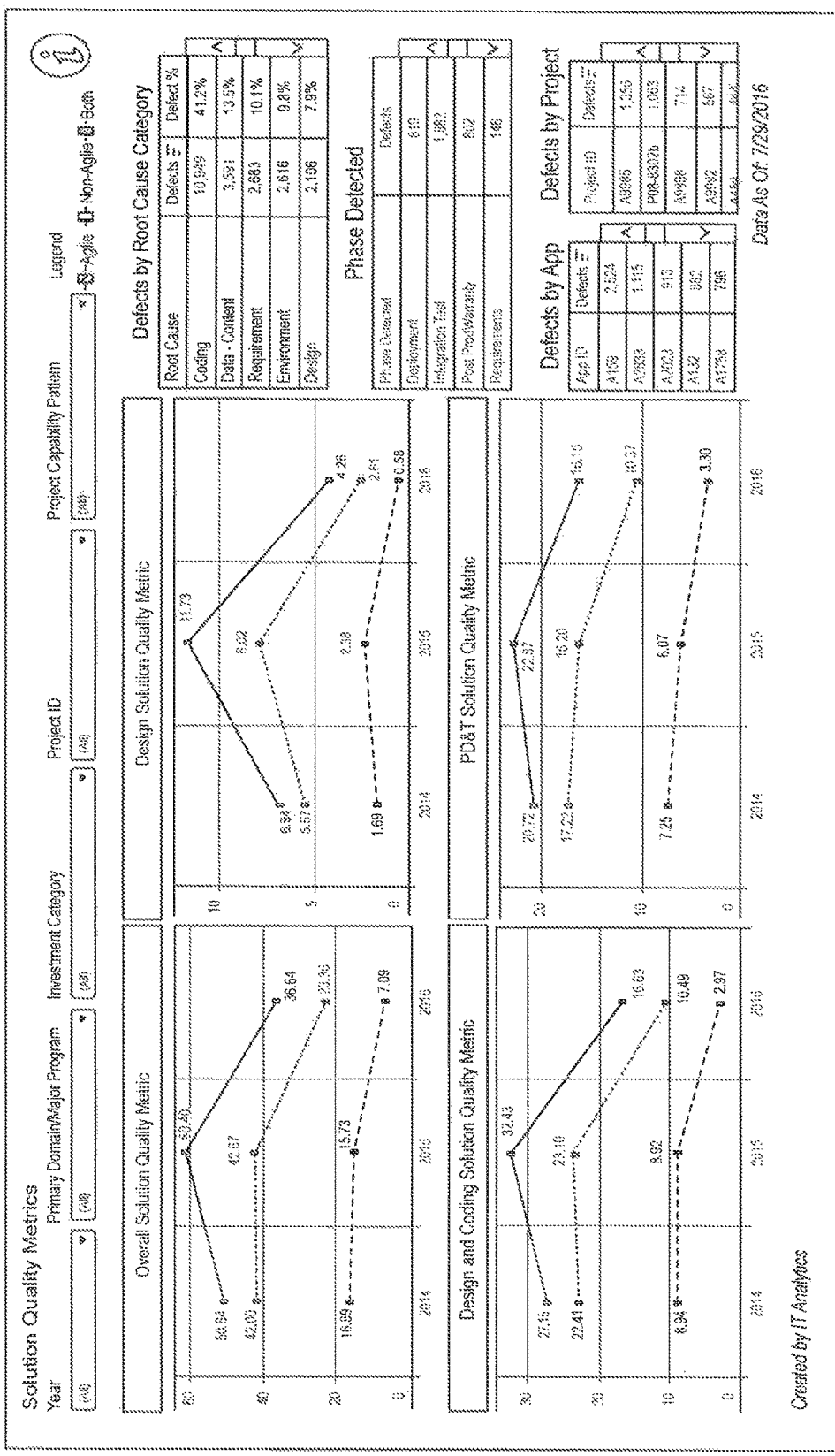

FIG. 6 illustrates another view of the "Solutions Quality Metrics" view of the UI 110. This view shows four separate charts juxtaposed together. The four charts are "Overall Solution Quality Metric," "Design Solution Quality Metric," "Design and Coding Solution Quality Metric," and "PD&T Solution Quality Metric." The "Overall Solution Quality Metric" chart illustrates a total number of defects per cost over a selected year. The "Design Solution Quality Metric" chart illustrates a number of design defects per cost in a selected year. The "Design and Coding Solution Quality Metric" chart illustrates a number of design and coding defects per cost in a selected year. The "PD&T Solution Quality Metric" chart illustrates a number of Requirements, Data, Testing, and Environment defects per cost in a selected year.

The above described charts can be manipulated by a user based on selections provided in drop down boxes. In the illustrated embodiment, there are five drop down boxes above the four charts. In this view of the "Solutions Quality Metrics," the five drop-down boxes are: a "Year" box, a "Primary Domain/Major Program" box, an "Investment Category" box, a "Project ID" box and a "Project Capability Pattern" box. The "Year" box allows a user to select a year of data associated with the application of interest. The "Primary Domain/Major Program" box represents primary domains and major programs of the projects utilizing the application. For instance, in a project is part of a major program (as defined by the business organization utilizing the application), the project will be associated with the program in the graph, and if not, the project will be associated with its primary domain. The "Investment Category" box allows a user to select a specific organization that funded the application/project. The user can also select "All" as illustrated such that the defects from the perspective of the total investment is analyzed. The "Project ID" box allows a user to select a specific project/application to visualize the defect data in the charts below the drop-down box. The "Project Capability Pattern" box allows a user to select a type of project/application, such as Agile or Non-Agile or All (both Agile and Non-Agile), for visualization.

The illustrated view of the "Solutions Quality Metrics" in FIG. 6 further includes four tables. The first table is the "Defects by Root Cause Category," which relates a "Root Cause" to a "Defects" amount and to an overall "Defects %." This allows the system to determine which root cause attributed the largest amount of defects. The second table is the "Phase Detected" which relates a development/deployment phase to a number of defects experienced during that phase. This allows the system to determine a number of defects during various implementation stages for the project/application. The third table is the "Defects by App" table that relates an "App ID" to a "Defects" amount. The fourth table is the "Defects by Project" that relates a "Project ID" to a "Defects" amount.

Figure 7:
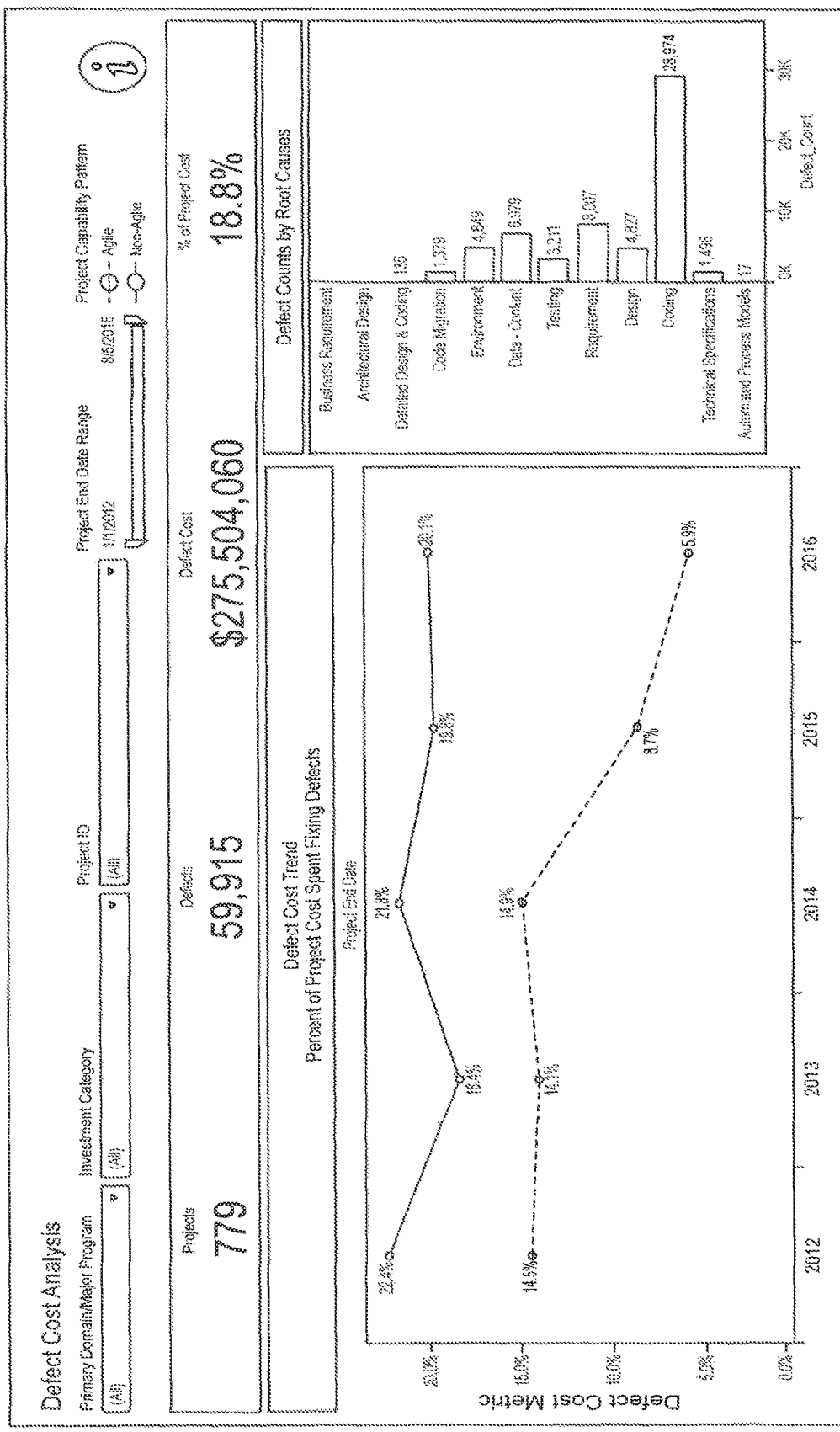

FIG. 7 illustrates a "Defects Cost Analysis" view embodiment of the UI 110 that shows a "Defect Cost Trend Percent of Project Cost Spent Fixing Defects" chart. This chart illustrates a defect cost metric over time. The time period is defined based on the selected range in the "Project End Date Range" field. Additionally, the illustrated embodiment shows a tabulation of results that includes a number of "Projects," a number of "Defects" within those projects, a total cost for those defects shown as the "Defect Cost," and a percentage of the total project cost spent on fixing those defects listed as the "% of Project Cost." This data can be calculated based on the selections made by a user in three drop-down boxes—a "Primary Domain/Major Program" box, an "Investment Category" box, and a "Project ID" box. The "Primary Domain/Major Program" box represents primary domains and major programs of the projects utilizing the application. The "Investment Category" box allows a user to select a specific organization that funded the application/project. The user can also select "All" as illustrated such that the defects from the perspective of the total investment is analyzed. The "Project ID" box allows a user to select a specific project/application to visualize the defect data in the charts below the drop-down box. Utilizing this data, the system can determine a percentage of project cost utilized to fix defects over time.

Further, FIG. 7 illustrates a "Defect Counts by Root Causes" bar graph alongside the "Defect Cost Trend Percent of Project Cost Spent Fixing Defects" chart. This bar graph shows a defect count realized from various aspects of the application development. This allows the system to determine the largest root cause contributor to causing defects, and therefore, can be related to a largest cost root cause of the defects.

FIG. 8 illustrates exemplary predictions from both the DCP module 106 and the DRST module 108. The predictions are illustrated in tabular form. In the illustrated embodiment, the table shows a "Project ID," an "App ID," a "Release Month," a "Release Year," a "Domain Quality Assurance (QA)," a "Domain Application Development (AD)," and a "Capability Pattern (e.g., Waterfall, Agile, Hybrid, etc.)." For each of these, two questions are shown regarding whether compliance data was collected and whether performance testing was performed. Further, for each entry "Pre-Implementation Findings," "Pre-Implementation Defects at Rise Signoff," and "System Test Scripts" are shown. Further, a Deployment Risk Score (DRS) is calculated along with an Estimated Defect Removal Efficiency (DRE) and an Estimated Number of Post-Implementation Defects.

Figure 2:
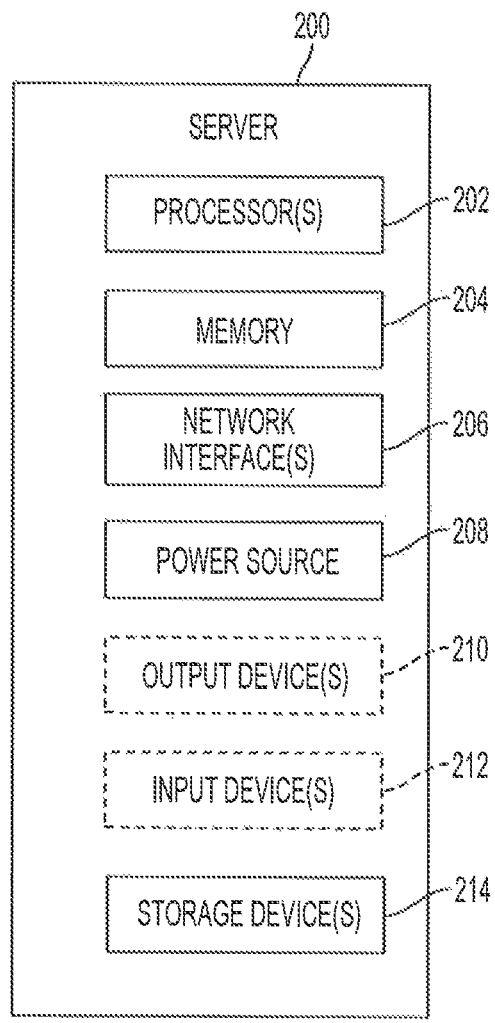
FIG. 2 illustrates components of a server according to an embodiment of the disclosure.

Returning now to FIG. 1, the software defect reduction server 102 is shown as a single server. However, the software defect reduction server 102 could be implemented using multiple interconnected servers or a cloud server. FIG. 2 illustrates components of a server 200 according to an embodiment of the disclosure. Server 200 illustrates the hardware components of certain embodiments of the software defect reduction server 102. In this regard, the RCA module 104, the DCP module 106, the DRST module 108 and the ETL 112 may be represented as states of a processor of the server 200. Further, in certain embodiments. UI 110 is hosted by the server 200 for access by a user via one or more peripheral devices connected to the server 200 via a network interface. Additionally, in certain embodiments, the central database 122 may be provided by the server 200.

Accordingly, the server 200 may include one or more processors 202, memory 204, network interfaces 206, power source 208, output devices 210, input devices 212, and storage devices 214. Although not explicitly shown in FIG. 2, each component provided is interconnected physically, communicatively, and/or operatively for inter-component communications in order to realize functionality ascribed to the server 200. To simplify the discussion, the singular form will be used for all components identified in FIG. 2 when appropriate, but the use of the singular does not limit the discussion to only one of each component. For example, multiple processors may implement functionality attributed to processor 202.

Processor 202 is configured to implement functions and/or process instructions for execution within server 200. For example, processor 202 executes instructions stored in memory 204 or instructions stored on a storage device 214. In certain embodiments, instructions stored on storage device 214 are transferred to memory 204 for execution at processor 202. Memory 204, which may be a non-transient, computer-readable storage medium, is configured to store information within server 200 during operation. In some embodiments, memory 204 includes a temporary memory that does not retain information stored when the server 200 is turned off. Examples of such temporary memory include volatile memories such as random access memories (RAM), dynamic random access memories (DRAM), and static random access memories (SRAM). Memory 204 also maintains program instructions for execution by the processor 202 and serves as a conduit for other storage devices (internal or external) coupled to server 200 to gain access to processor 202.

Storage device 214 includes one or more non-transient computer-readable storage media. Storage device 214 is provided to store larger amounts of information than memory 204, and in some instances, configured for long-term storage of information. In some embodiments, the storage device 214 includes non-volatile storage elements. Non-limiting examples of non-volatile storage elements include floppy discs, flash memories, magnetic hard discs, optical discs, solid state drives, or forms of electrically programmable memories (EPROM) or electrically erasable and programmable (EEPROM) memories.

Network interfaces 206 are used to communicate with external devices and/or servers. The server 200 may comprise multiple network interfaces 206 to facilitate communication via multiple types of networks. Network interfaces 206 may comprise network interface cards, such as Ethernet cards, optical transceivers, radio frequency transceivers, or any other type of device that can send and receive information. Non-limiting examples of network interfaces 206 include radios compatible with several Wi-Fi standards, 3G, 4G, Long-Term Evolution (LTE), Bluetooth®, etc.

Power source 208 provides power to the server 200. For example, the server 200 may include a regulator for regulating power from the power grid when the server 200 is plugged into a wall outlet.

In some embodiments, server 200 may also be equipped with one or more output devices 210. Output device 210 is configured to provide output to a user using tactile, audio, and/or video information. Examples of output device 210 may include a display (cathode ray tube (CRT) display, liquid crystal display (LCD) display, LCD/light emitting diode (LED) display, organic LED display, etc.), a sound card, a video graphics adapter card, speakers, magnetic, or any other type of device that may generate an output intelligible to user 104.

In some embodiments, server 200 is equipped with one or more input devices 212. Input devices 212 are configured to receive input from user 104 or the environment where server 200 resides. In certain instances, input devices 212 include devices that provide interaction with the environment through tactile, audio, and/or video feedback. These may include a presence-sensitive screen or a touch-sensitive screen, a mouse, a keyboard, a video camera, microphone, a voice responsive system, or any other type of input device.

The hardware components described thus far for server 200 are functionally and communicatively coupled to achieve certain behaviors. In some embodiments, these behaviors are controlled by software running on an operating system of server 200. For instance, the software defect reduction server 102, the databases 114-122, and the ETL 112 may include one or more computer devices similar to server 200. The input devices 212 and the output devices 210 may be used by the software defect reduction server 102 to receive direct inputs and provide direct outputs to a user with access to the software defect reduction server 102.

Figure 3:
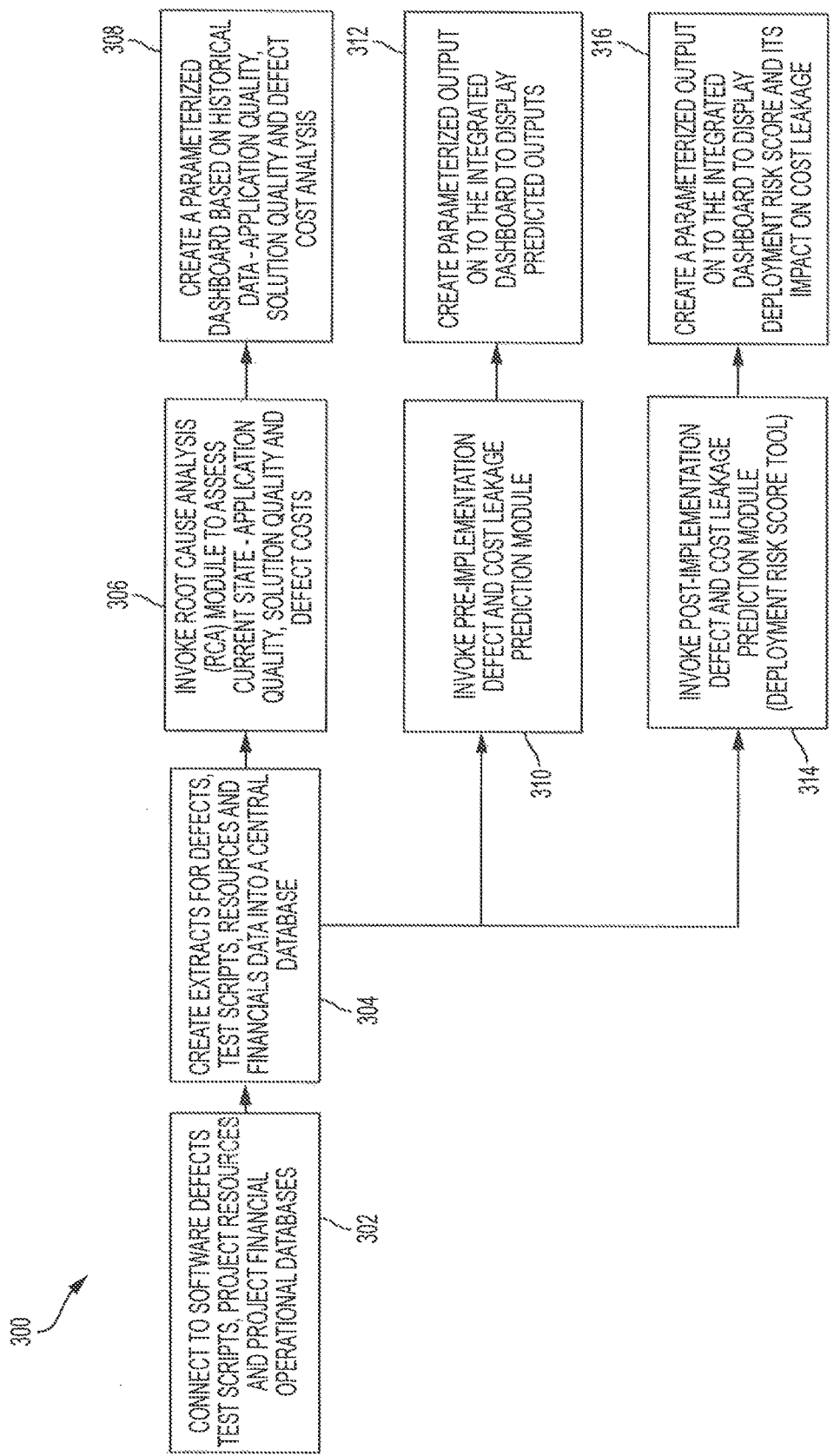
FIG. 3 illustrates a process for holistic, integrated and intelligent software defect reduction in complex software projects, in accordance with certain embodiments of the disclosure.

FIG. 3 illustrates a process 300 that shows various steps performed by each of the RCA module 104 (see FIG. 1), the DCP module 106 and the DRST module 108. Process 300 begins at step 302, which connects to Software Defects, Test Scripts, Project Resources and Project Financial databases 114-120 in order to collect relevant implementation data related to historical software application projects. The relevant implementation data is collected based on previously collected implementation parameters directed to features of a software application currently being developed. At step 304, the relevant implementation data the relevant implementation data is collected by creating extracts for the defects, test scripts, resources and financials data into the central database 122. In certain embodiments, this step is performed by the ETL 112.

The subsequent steps 306-316 are performed by one of the RCA module 104 (see FIG. 1), the DCP module 106 or the DRST module 108. In the illustrated embodiment, steps 306 and 308 are performed by the RCA module 104. At step 306, the RCA module is invoked to perform a root cause analysis to assess a current state of the software application in development. This assessment involves a determination of application quality, solution quality for any defects, and a defect cost. At step 308, the RCA module 104 sends the results of its analysis to the integrated dashboard UI 110 in order to create a parameterized dashboard based on historical data relevant to the software application currently under development. This analysis includes graphics useful to a user for the application quality, solution quality of the defect, and a defect cost analysis.

The DCP module 106 (see FIG. 1) performs steps 310 and 312. At step 310, the DCP module 106 is invoked by collecting relevant implementation data passed to it from the RCA module 104 and the DCP module 106 applies a prediction model to the relevant implementation data. At step 312, the DCP module 106 creates a parameterized output to be displayed at the integrated dashboard UI 110. This output is the pre-implementation predicted defect and cost created by the PDC module 106.

The DRST module 108 (see FIG. 1) performs steps 314 and 316. At step 314, the DRST module 108 is invoked after it receives pre-implementation defects and costs prediction from the PDC module 106. At step 316, the DRST module 108 creates a parameterized output to be displayed at the integrated dashboard UI 110. This output is the post-implementation predicted Deployment Risk Score created by the PDC module 106.

Steps 306-316 will be selected for execution by the software defect reduction server 102 (see FIG. 1) based on a user choice made at the UI 110. For instance, if the user selects a root cause analysis, steps 302, 304, 306 and 308 will be executed. However, if a user only selects a pre-implementation prediction, then only steps 302, 304, 310 and 312 will be performed. If a user only selects a post-implementation prediction, then only steps 302, 304, 314 and 316 will be performed.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method for software defect reduction performed by a software defect reduction server, the method comprising:
    collecting implementation parameters for a software application in a development phase;
    performing an Extract, Transform and Load (ETL) from one or more databases based on the implementation parameters to obtain relevant implementation data, wherein the one or more databases store implementation data related to previously developed software applications no longer in the development phase and the relevant implementation data is data stored in the one or more databases that is relevant to the implementation parameters; and
    summarizing the relevant implementation data to obtain predicted data relevant to the software application in the development phase,
    wherein the implementation parameters comprise one or more of: a number of test scripts for the software application, a number of defects experienced by the software application during the development phase, and whether performance testing was performed, and
    wherein the predicted data is a Deployment Risk Score (DRS) that provides a risk of the software application experiencing post-implementation defects based on an analysis of the implementation data related to the previously developed software applications no longer in the development phase.

2. The method of claim 1, wherein the relevant implementation data comprises information regarding software defects experienced by the previously developed software applications.

3. The method of claim 2, wherein the information regarding software defects experienced by the previously developed software applications comprises a type of defect and one or more of: a solution for the type of defect, a development phase that the previously developed software was in when it experienced the type of defect, a root cause of the type of defect, and a cost of correcting the type of defect.

4. The method of claim 1, wherein the implementation parameters comprise one or more of: a timeline for the development phase of the software application, an average developer experience, an average manager experience, an average architect experience, an average analyst experience, an average test experience, and an average labor cost.

5. The method of claim 4, wherein the relevant implementation data comprises cost information relevant to the software application in the development phase.

6. The method of claim 5, wherein the summarizing the relevant implementation data comprises performing a Random Forest algorithm on the relevant implementation data.

7. A system for software defect reduction, the system comprising:
    a software defect reduction server comprising a processor configured for:
        collecting implementation parameters for a software application in a development phase;
        performing an Extract, Transform and Load (ETL) from one or more databases based on the implementation parameters to obtain relevant implementation data, wherein the one or more databases store implementation data related to previously developed software applications no longer in the development phase and the relevant implementation data is data stored in the one or more databases that is relevant to the implementation parameters; and
        summarizing the relevant implementation data to obtain predicted data relevant to the software application in the development phase,
    wherein the implementation parameters comprise one or more of: a number of test scripts for the software application, a number of defects experienced by the software application during the development phase, and whether performance testing was performed,
    wherein the predicted data is a Deployment Risk Score (DRS) that provides a risk of the software application experiencing post-implementation defects based on an analysis of the implementation data related to the previously developed software applications no longer in the development phase.

8. The system of claim 7, wherein the relevant implementation data comprises information regarding software defects experienced by the previously developed software applications.

9. The system of claim 8, wherein the information regarding software defects experienced by the previously developed software applications comprises a type of defect and one or more of: a solution for the type of defect, a development phase that the previously developed software was in when it experienced the type of defect, a root cause of the type of defect, and a cost of correcting the type of defect.

10. The system of claim 7, wherein the implementation parameters comprise one or more of: a timeline for the development phase of the software application, an average developer experience, an average manager experience, an average architect experience, an average analyst experience, an average test experience, and an average labor cost.

11. The system of claim 10, wherein the relevant implementation data comprises cost information relevant to the software application in the development phase.

12. The system of claim 11, wherein the summarizing the relevant implementation data comprises performing a Random Forest algorithm on the relevant implementation data.

13. A non-transitory computer-readable medium containing computer executable instructions for software defect reduction, the computer readable instructions, when executed by a processor, cause the processor to perform steps comprising:
    collecting implementation parameters for a software application in a development phase;
    performing an Extract, Transform and Load (ETL) from one or more databases based on the implementation parameters to obtain relevant implementation data, wherein the one or more databases store implementation data related to previously developed software applications no longer in the development phase and the relevant implementation data is data stored in the one or more databases that is relevant to the implementation parameters; and summarizing the relevant implementation data to obtain predicted data relevant to the software application in the development phase, wherein the implementation parameters comprise one or more of: a number of test scripts for the software application, a number of defects experienced by the software application during the development phase, and whether performance testing was performed, and wherein the predicted data is a Deployment Risk Score (DRS) that provides a risk of the software application experiencing post-implementation defects based on an analysis of the implementation data related to the previously developed software applications no longer in the development phase.

14. The non-transitory computer-readable medium of claim 13, wherein the relevant implementation data comprises information regarding software defects experienced by the previously developed software applications.

15. The non-transitory computer-readable medium of claim 14, wherein the information regarding software defects experienced by the previously developed software applications comprises a type of defect and one or more of: a solution for the type of defect, a development phase that the previously developed software was in when it experienced the type of defect, a root cause of the type of defect, and a cost of correcting the type of defect.

16. The non-transitory computer-readable medium of claim 13, wherein:

the implementation parameters comprise one or more of: a timeline for the development phase of the software application, an average developer experience, an average manager experience, an average architect experience, an average analyst experience, an average test experience, and an average labor cost;

the relevant implementation data comprises cost information relevant to the software application in the development phase; and the summarizing the relevant implementation data comprises performing a Random Forest algorithm on the relevant implementation data.

* * * * *